United States Patent [19]

Chuang

[11] Patent Number: 5,226,045
[45] Date of Patent: Jul. 6, 1993

[54] METHOD AND APPARATUS FOR AUTONOMOUS SELECTIVE ROUTING DURING RADIO ACCESS IN TDMA PORTABLE RADIO SYSTEMS

[75] Inventor: Justin C. Chuang, Holmdel, N.J.

[73] Assignee: Bell Communications Research, Inc., Livingston, N.J.

[21] Appl. No.: 880,054

[22] Filed: May 7, 1992

[51] Int. Cl.$^5$ .............................. H04B 7/212
[52] U.S. Cl. ........................ 370/95.3; 379/61; 455/52.1; 455/56.1; 455/62
[58] Field of Search .............. 455/33.1, 33.4, 34.2, 455/52.1, 53.1, 54.1, 54.2, 56.1, 62, 135; 379/58, 61, 63; 370/95.1, 95.3

[56] References Cited

U.S. PATENT DOCUMENTS

| | | | |
|---|---|---|---|
| 4,737,978 | 4/1988 | Burke et al. | 379/60 |
| 4,849,991 | 7/1989 | Arnold et al. | 375/84 |
| 4,937,841 | 6/1990 | Chuang et al. | 375/94.1 |
| 4,941,155 | 7/1990 | Chuang et al. | 375/84 |
| 5,038,399 | 8/1991 | Bruckert | 455/62 |
| 5,084,891 | 1/1992 | Ariyavisitakul et al. | 371/42 |
| 5,161,249 | 11/1992 | Meche et al. | 455/56.1 |

OTHER PUBLICATIONS

"Portable Digital Radio Communications-An Approach to Tetherless Access", D. C. Cox, *IEEE Communications Magazine*, Jul. 1989, pp. 30-40, vol. 27, No. 7.

"Universal Digital Portable Radio Communications", D. C. Cox, *Proceedings of the IEEE*, vol. 75, No. 4, Apr. 1987, pp. 436-477.

"Comparisons of Channel Assignment Strategies in Cellular Mobile Telephone Systems", M. Zhang, T. S. Yum, *Proc. IEEE ICC'89*, Jun. 1989, pp. 467-471.

*Primary Examiner*—Benedict V. Safourek
*Attorney, Agent, or Firm*—Leonard Charles Suchyta; Stephen M. Gurey

[57] ABSTRACT

In a TDM/TDMA digital radio communications system, each portable unit in accessing the system must select the "best" port through which to route each call. The so called "best" port may not, however, have an idle time-slot to accommodate the call. Attempts to route a call through a busy "best" port, or busy "second best" port will decrease the throughput of the network and result in increased call setup time. An autonomous selective routing scheme is described which increases system throughput and decreases call setup time. When a user at a portable unit (301) desires to access the network, the portable unit scans (308, 309) the downlink frequencies associated with each of the ports in the system. For each port, the portable measures signal quality (310) and determines from the received bit patterns (313) whether the port has an idle time-slot. The highest signal quality measure for a port having an idle time-slot is determined (315) and the call is routed through that port if that highest signal quality measure exceeds (317) a predetermined quality measure threshold. Otherwise, the call is blocked.

15 Claims, 3 Drawing Sheets

METHOD AND APPARATUS FOR AUTONOMOUS SELECTIVE ROUTING DURING RADIO ACCESS IN TDMA PORTABLE RADIO SYSTEMS

BACKGROUND OF THE INVENTION

This invention relates to the selection of the port to which a portable unit communicates in a frequency-reusing radio communications system such as a time division multiplexed/time division multiple access (TDM/TDMA) system used for low power portable digital telephony.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least to a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, more than 25 million cordless telephone sets are in use today throughout the United States with demand for these sets continuing to rise as the price of cordless telephones with increasing sophisticated has remained within a $100.00 to $200.00 range. In addition, more than three million cellular telephone sets are currently in use throughout the United States. As the price of various cellular sets falls from more than a $1000.00 which occurred merely a year ago to only a few hundred dollars today, the demand for these sets has increased precipitously. As a result, the number of installed sets has climbed at such an astonishing rate that in certain urban areas, such as New York, the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, July 1989 pages 30–40; and Cox, "Universal Digital Portable Radio Communications", Proceedings of the IEEE, Vol. 75, No. 4, April 1987, pages 436–476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made therethrough. While preprogrammed digital or tone access codes are being used between individual handset-base unit pairs and provide sufficient protection against casual attempts at unauthorized access, these codes are not sufficiently sophisticated to successfully deter a determined orderly assault on a cordless telephone by an unauthorized user. Furthermore, while cordless telephones provide limited portable radio access to a wireline access point, from a network standpoint cordless telephones do not eliminate the need for telephone lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5-10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the amount of time that the portable transceiver can be used before it requires recharging its often quite limited. Furthermore, the cost of these rechargeable batteries and hence of the portable transceiver is rather high. Moreover, high radiated power levels, such as that which emanate from a mobile or portable cellular transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these cells. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic over wired trunks often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a base station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers that those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraians when used within buildings.

In contrast to the tetherless systems discussed above, radio paging systems provide simple unidirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony uses low power multiplexed radio links that operate on a time division multiplexed/time division multiple access (TDM/TDMA) basis to provide a number of separate fully duplex demand-assigned digital channels between a port and each of its associated portables. Specifically, each port would transmit time division multiplexed (TDM) bit streams on a predefined carrier frequency, with, in turn, each portable that accesses that port responding by transmitting a TDMA burst on a common though different predefined carrier frequency from that used by the port. Quadrature phase shift keying (QPSK0), with an inter-carrier spacing of 150 to 300 KHz and within a given operating frequency band situated somewhere between approximately 0.5 to 5 GHz would be used by both the port and portables. The power used by the transmitter in the portable would range between 5-10 milliwatts or less on average and provide a range of several hundred to a thousand feet. As such, the resulting low radiated power would pose essentially no biological radiation hazard to any user. In addition, the port antenna would be relatively small and suitable for mounting on a utility or light pole. With this transmission range, a port could simultaneously serve typically 20-30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data carried on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50-100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. Various aspects of TDMA have been treated in prior art patents such as U.S. Pat. No. 4,849,991, entitled "Method and Circuitry for Determining Symbol Timing for Time Division Multiple Access Radio Systems," issued Jul. 18, 1989 to H. W. Arnold and N. R. Sollenberger; U.S. Pat. No. 4,937,841, entitled "Method and Circuitry for Carrier Recovery for Time Division Multiple Access Radio Systems," issued Jun. 16, 1990 to J. C. Chuang, inventor herein, and N. R. Sollenberger; U.S. Pat. No. 4,941,155, entitled "Method and Circuitry for Symbol Timing and Frequency Offset Estimation in Time Division Multiple Access Radio Systems," issued Jul. 10, 1990 also to the inventor herein and N. R. Sollenberger; and U.S. Pat. No. 5,084,891, entitled "A Technique for Jointly Performing Bit Synchronization and Error Detection in a TDM/TDMA System," issued Jan. 28, 1992 to S. Ariyavisitakul, L-F Chang and N. R. Sollenberger.

In co-pending patent application Ser. No. 619,059, filed Nov. 28, 1990 by the inventor herein and N. R. Sollenberger, a method and apparatus for autonomous adaptive frequency assignment in a TDMA portable radio system is disclosed. That application deals with the assignment and coordination of the radio frequencies at the ports. In accordance with that invention the port frequencies are assigned based on a simple autonomous procedure based on strength measurements at the ports. The algorithm of that invention is performed when a system is installed, when growth in a system has occurred, and can be repeated on a regular basis to account for changing topological conditions. It is an off-line process that is scheduled so as to minimize service disruptions.

Upon initiating a call, procedures for selecting which base station a portable transceiver communicates with in a vehicular cellular system, or to which port a portable communicates with in a TDM/TDMA portable radio communications system, are generally determined by power strength measurements at the portable of signals transmitted by the base station or port. In today's vehicular cellular system, the mobile/portable transceivers talk to the strongest base station initially on a setup channel. The base station then assigns the available frequency channels for communications. If all the channels in a port are busy, the subsequent calls are blocked until a channel becomes idle upon the departure of an active call. If some ports are accessed by a higher than average number of mobiles, a higher total system blocking will result. A concept known as "channel borrowing" has been proposed that shifts more traffic channels to the busy ports (see e.g., S. Elnoubi, R. Singh, and S. Gupta, "A New Frequency Channel Assignment Algorithm in High Capacity Mobile Communication Systems," *IEEE Trans. Veh. Technol.*, vol. TV-31, pp.125-131, Aug. 1982; and M. Zhang and T. Yum, "Comparisons of Channel Assignment Strategies in Cellular Mobile Telephone Systems," *Proc. IEEE ICC'89*, Jun. 1989, pp. 467-471). This concept requires a real-time, centralized control to disallow the "borrowed" channels from being reused within a given distance. No successful implementations of this concept have been reported.

In TDM/TDMA portable radio communication systems a similar blocking mechanism occurs when all the time-slots at a port are busy. Procedures for selecting the optimum port and optimum time-slot upon user access to such a system are described by R. C. Bernhardt in "User Access in Portable Radio Systems in a Co-Channel Interference Environment," *IEEE Journal of Selected Areas in Communications*, pp. 49–58, January 1989, and in "Time-Slot Management in Frequency Reuse Digital Portable Radio Systems," *Proceedings, IEEE VTC'90*, pp. 282–286 May 1990, respectively. In the first noted article hereinabove, a two-stage access algorithm is described. In the first stage the relative in-band power on each channel is measured by the portable desiring access and the channels are rank ordered by relative power to form a candidate list. In the second stage, the block error rate of the first ranked channel is measured and if less than a predetermined threshold level, the algorithm is completed. If the block error rate is greater than the threshold, the next channel on the rank order list is examined to determine its block error rate. This algorithm to locate the best quality channel does not concern itself with the traffic implications if the so called "best" channel has no time-slots available to complete the connection. Furthermore, in order to measure the block error rate in the second stage of the algorithm, the call must be actually routed to the channel under consideration, and if too large an error rate is measured the call must be rerouted to the next channel on the rank ordered power list. Again, no consideration is given whether that next best channel is available. Furthermore, constant rerouting to locate the "best" channel delays the call setup will and is wasteful of system resources by decreasing throughput. A simple "retry" access algorithm in which the portable just retries another port if the preferred "best" port is busy has similar system disadvantages as the two-stage access algorithm, specifically, call setup delay and higher blocking due to increased access requests to each port.

An object of the present invention is to improve the throughput of portable/mobile communications by using an autonomous selective routing technique that routes a call to a port only after a priori determining that the port has an acceptable quality measure and that the port is available to accept the call.

SUMMARY OF THE INVENTION

In accordance with the present invention, a portable unit in a frequency-channelized frequency-reusing radio system, including FDMA and TDM/TDMA systems, is autonomously routed to the best available port. In attempting to access a radio port, a portable unit first scans all serving frequencies (ports). As it scans each port frequency, the portable unit derives from the signal received from each port a quality measure, and also determines whether or not that port is free to be accessed. Specifically, in a TDM/TDMA system, the portable determines for each scanned port whether there is an idle time-slot on which the call can be routed. An access attempt is made to the port having the best quality measure if and only if the port scan has indicated that the port was accessible and if and only if the quality measure for this "best" port is sufficiently large enough for acceptable performance.

Advantageously, port routing is avoided if there is not an acceptable quality measure, and no access/routing attempts are made unless the port can accept the call. Throughput can therefore be increased without undue increase of access attempts, and no delay is introduced because of blocking. Furthermore, the method of the present invention achieves the "channel borrowing" effects to handle small-scale traffic inhomogeneity.

DETAILED DESCRIPTION

Figure 1:
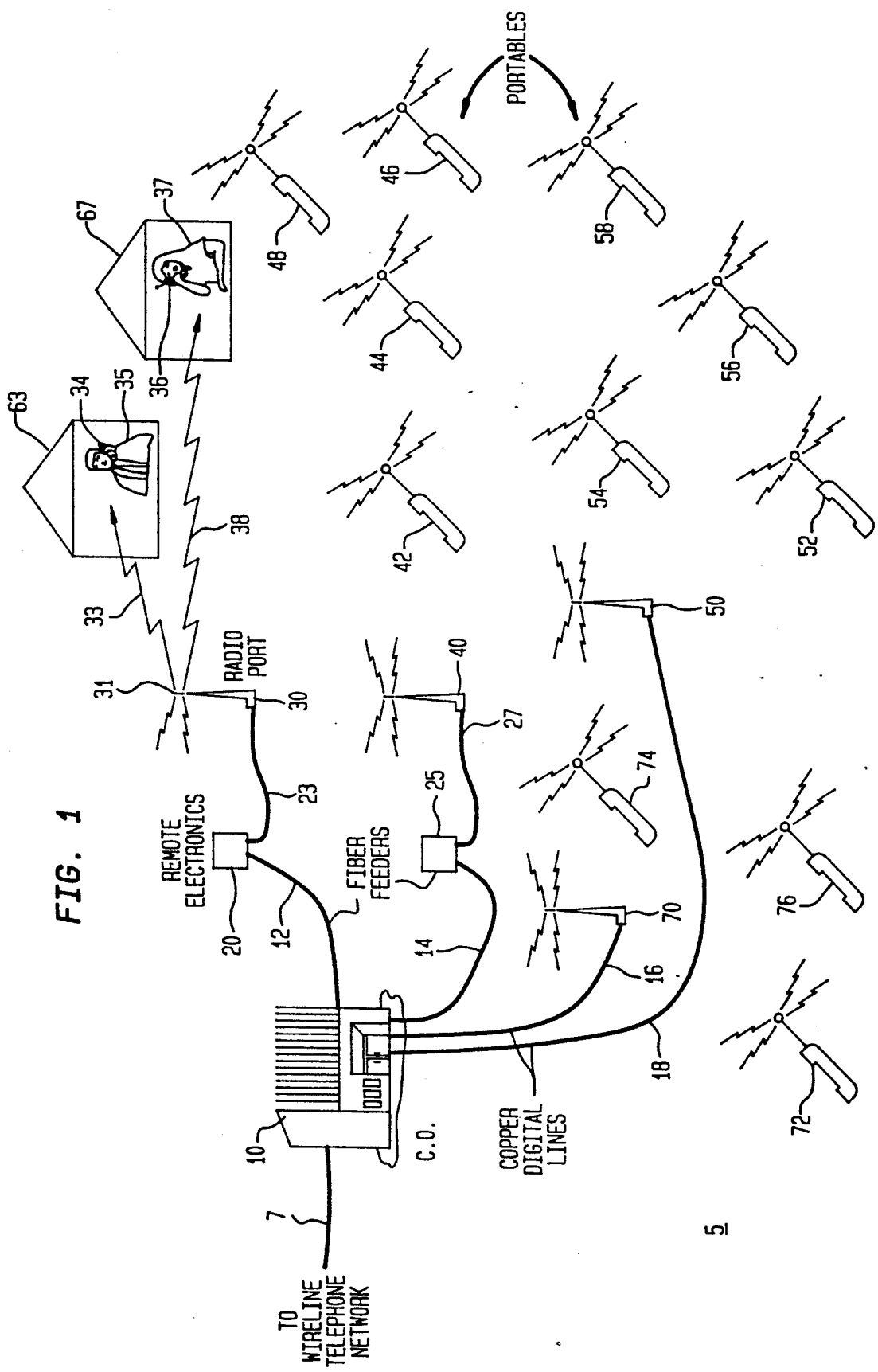
FIG. 1 shows a portable radio system using radio ports to provide tetherless communications.

An overall diagram of a low power portable TDM/TDMA digital telephony system 5 is shown in FIG. 1. Low power digital portable telephony utilizes a fixed base unit (referred to as a "port") and a number of mobile transceivers (each of which is referred to as a "portable"). Through use of time division multiple access (TDMA), each portable can access the port through a separate demand-assigned TDMA channel to carry duplex communication on a time division multiplexed (TDM) basis therebetween. The power used by the transmitter in each portable would range between 5–10 milliwatts or less on average and provide a range of several hundred to a thousand feet between a port and each of its portables. To accommodate a relatively large service area, several ports are used with individual calls being successively handed off from port to port as their corresponding callers carry their portables from the service area associated with one port to that of an adjacent port. An appropriate switch (not shown) which is located within a local central end office is suitably programmed to operate in a similar manner as does a mobile telephone switching office in order to controllably handoff calls from port to port as the callers transit corresponding local service areas associated therewith.

Specifically, system 5 contains four ports 30, 40, 50 and 70 and respective portables 34 and 36; 42, 44, 46 and 48; 52, 54, 56 and 58; and 72, 74 and 76. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 40, onto fiber feeders 12 and 14 which, in turn, feed central office 10. The switch located within the central office is connected, through trunk 7, to the wireline telephone network.

Each port would transmit time division multiplexed (TDM) bit streams on a predefined carrier frequency using quadrature phase shift keying (QPSK) modulation, with an inter-carrier spacing of 150 to 300 KHz and within a given operating frequency band situated somewhere between approximately 0.5 to 5 GHz. With this transmission range, a port could simultaneously serve as many as typically 20 separate locally situated portables that each carries digitized speech at a bit rate of 16 kbits/second. Here, ports 30, 40, 50 and 70 respectively serve portables 34 and 36; 42, 44, 46 and 48; 52, 54, 56 and 58; and 72, 74 and 76. The same TDM channels would be reused at different ports that are spaced sufficiently far apart, such as ports 30 and 70, to reduce co-channel interference to an acceptably low level but yet conserve valuable spectrum. However, adjacent ports would be situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and receive TDMA bursts therefrom. Given the carrier frequencies being used, each of these antennas is relatively small and suitable for mounting on a utility or light pole or within an office building.

Inasmuch as system 5 replaces local copper drops and telephone cords with short range low power radio links, ambulatory callers are provided with completely tetherless access. Accordingly, through radio links 33 and 38, illustrative callers 35 and 37 located within respective residences 63 and 67 are completely free to move within the entire service area provided by system 5, i.e. that provided by ports 30, 40, 50 and 70, while advantageously maintaining continuity of their existing telephone conversations as well as being able to place calls through other ("non-home") ports as their travel progresses.

Each port continuously transmits on a TDM basis, while portables transmit in bursts on a TDMA basis to their associated port. Two different carrier frequencies are used to carry communication between each port and a portable: one frequency, frequency f1 for port 30, to carry communication from that port to each of its portables (downlink transmission) and another frequency, frequency f2 for port 30, to carry communication from each of these portables to this port (uplink transmission). Although adjacent ports use different pairs of frequencies, one particular uplink frequency being associated with each downlink frequency, these carrier frequencies are also reused for ports that are spaced sufficiently far apart from each other to conserve spectrum. By employing the procedure of the aforenoted co-pending patent application of the present inventor and N. R. Sollenberger, Ser. No. 619,059 filed Nov. 28, 1990, the downlink frequencies of all ports (and thus that port's associated uplink frequency) are assigned so as to maintain an acceptable low level of co-channel interference at each port.

As one of the portable users desires to connect to the telephone network, that person's portable must select a channel and initiate an access protocol. Selecting a channel (i.e. a port to communicate with) requires determination of the "best" port having a vacant time slot. A "best" port is one determined by the portable to have the highest signal to impairment (SIR) ratio or other quality measure. Generally, this is likely to be that port which is closest to the portable. Thus in FIG. 1, portable 74 would most likely access port 70. Various topological and meteorological conditions, however, can affect the quality of transmission so that the nearest port may not be the "best" port for a portable to access. Therefore, in FIG. 1, the "best" port for portable 74 may not be the nearest port 70, but may rather be port 40 or port 50. The "best" port may also not be available. Although the system shown in FIG. 1 shows only a limited number of portable units associated with each port, in actual practice, however, many more portables may be communicating through a port in a particularly high traffic area thereby occupying all the vacant time slots on the channel. The "best" port with respect to signal quality may not, therefore, be the "best" available port.

Figure 2:
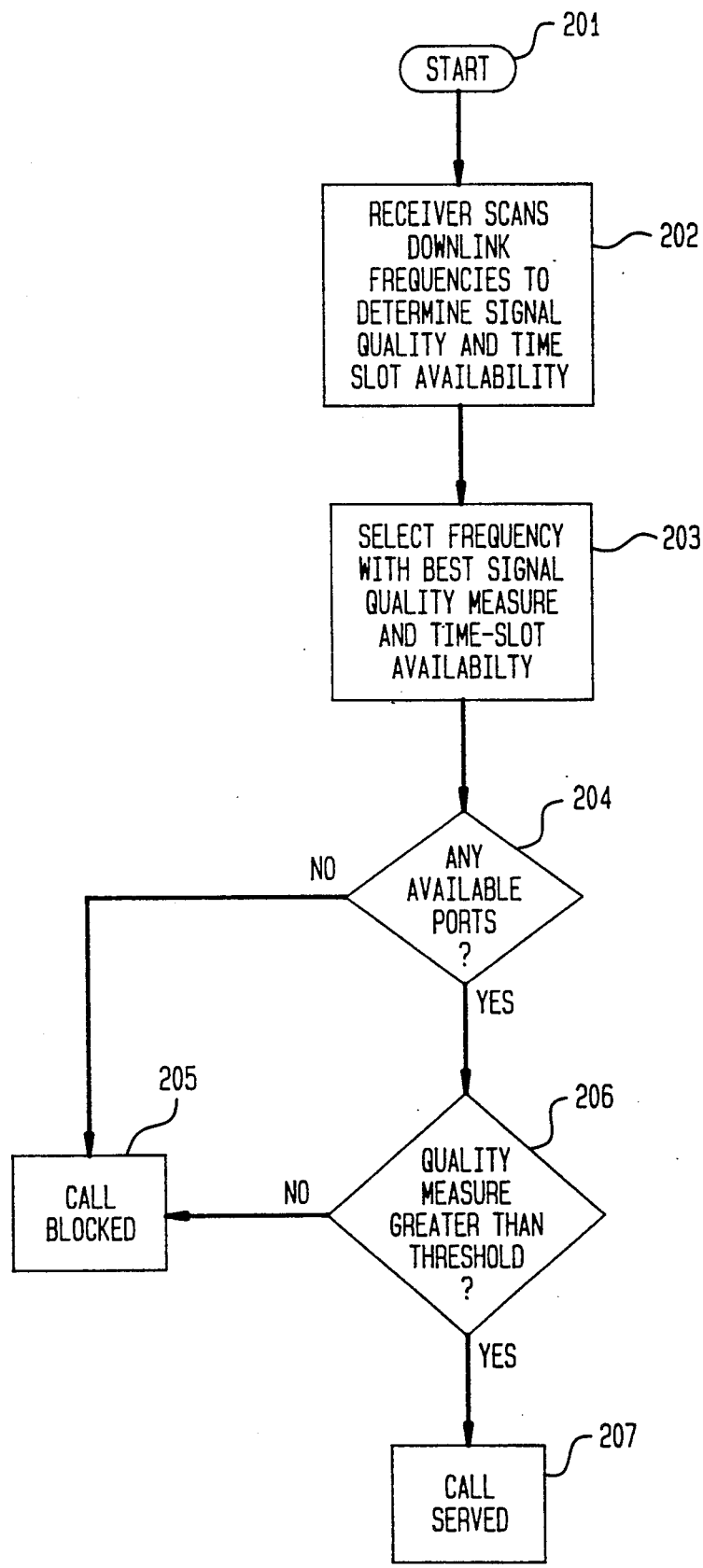
FIG. 2 is a flowchart of the autonomous selective routing procedure of the present invention that is performed by each portable unit in the system of FIG. 1 in accessing a port upon initiation of a call.
Figure 3:
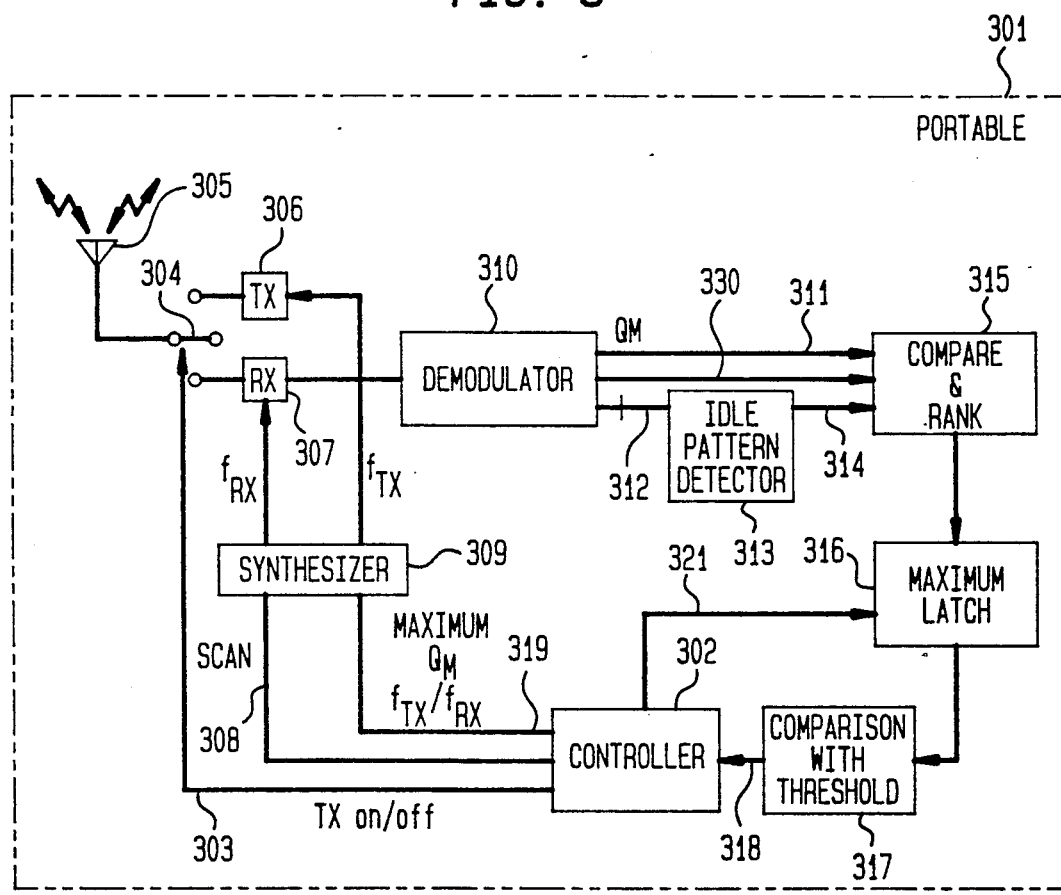
FIG. 3 is a block diagram of a portable unit showing the functional components needed to perform the autonomous selective routing procedure.

In order to employ the autonomous selective routing procedure, during radio access, of the present invention, each portable unit includes the apparatus shown in FIG. 3. Before describing this apparatus, the procedure of the present invention will be described in detail. FIG. 2 shows a flowchart diagram of the steps of the autonomous selective routing procedure, during radio access, of the present invention. The process is initiated at step 201 when the user at the portable initiates a call through the portable communications network by means of an initiate request. In response to the initiate request at step 202, the receiver in the portable unit scans each of the possible downlink frequencies associated with each port to determine for each possible channel both a signal quality measure and the availability of a time-slot on the channel. As will be described in connection with the portable equipment apparatus in FIG. 3, the signal quality measure of the downlink signal from each port is determined by the portable unit from the demodulation process of the received signaling waveform. Time-slot availability is determined by the portable unit from the demodulated bit pattern of the received downlink signals from each port. At step 203, after scanning all possible downlink frequencies, the frequency at which the "best" signal quality is measured and which associated channel has an available time-slot is determined. At decision step 204, the call is blocked (step 205) if there are no ports with an idle time-slot. If a port is available, at decision step 206 the signal quality measure for that "best" port is compared in the portable unit with a threshold signal quality measure. If the signal quality measure is below the threshold, the call is blocked (step 205). If the signal quality measure is greater than the threshold, the call is served (step 207), which means that the portable unit accesses the network through the port it determined as having the best signal quality measure and at least one available time-slot.

By employing the method of the present invention, access to the network is attempted only after determining that the port is both available and can provide satisfactory signal performance. Attempts to route a call through a port that would provide unsatisfactory performance or that does not have an available time-slot are therefore not made. Accordingly, routing of the call is effected autonomously by each portable unit in such a manner that precludes unnecessary and network blocking attempts, thereby providing a desirable improved throughput on the network.

FIG. 3 shows the apparatus at each portable 301 required to perform the above-described autonomous selective routing procedure. Each portable 301 includes a controller 302. In response to a portable user's request to initiate a call (such as by the user going "off-hook"), controller 302 develops a signal on lead 303 which controls a switch 304 connecting antenna 305 and the radio transmitting (TX) and receiving (RX) circuitry 306 and 307, respectively. In response to this signal on lead 303, switch 304 connects antenna 305 to the receive circuitry 307 to receive incoming transmission from the ports in the system. In response to a scan signal developed by controller 302 on lead 308, synthesizer 309 commences to scan the received signal from ports at each possible port frequency, $f_{RX}$. For any given port frequency, $f_{RX}$, the received signal contains transmissions from multiple ports spread across the system, with the main component contributed by the strongest port at that frequency. The output of receiving circuitry 307 is connected to a demodulator 310. Demodulator 310 could comprise circuitry of the type described in the aforenoted U.S. Pat. No. 4,941,155 to the inventor herein and N. R. Sollenberger. This patent is incorporated herein by reference. As described in detail in that patent, symbol timing in TDM/TDMA portable radio system is performed by finding the particular timing instant which produces the largest vector sum of the X and Y components of the expanded collapsed differential phase angles. This maximum vector sum, which is being calculated by register 424 in FIG. 4 of the noted patent, is directly related to signal to impairment ratio (signal being transmitted from the "best" port using that frequency; impairment including transmissions from all other ports using that frequency and other undesired interference such as noise) and can serve as a quality measure (QM) of the received signal as receiving circuitry 307 is scanned to each possible downlink port frequency, $f_{RX}$. Accordingly, as the receiving circuitry 307 is scanned to each port's downlink frequency, demodulator 310 outputs the QM associated with each successive downlink port frequency on lead 311.

If a time-slot is in an idle state, a particular idle bit pattern is transmitted thereon. Thus, by examining the demodulated bit stream in each time-slot, the availability of an idle time-slot on a port's channel is readily determined. The demodulated consecutive bursts of bit streams at the output of demodulator 310 on lead 312, representing the bit streams of the consecutive time-slots, are input to idle state pattern detector 313. If an idle pattern is not detected in any of the bit streams associated with any of the time-slots, no time-slot is available and that port is not a candidate port for routing of the impending call. If at least one idle pattern is detected, then a signal from idle pattern detector 313 on line 314 enables the QM for that port on lead 311 and an indication of that port's frequency, on lead 320, to be input to compare and rank circuit 315. Compare and rank circuit 315 consists of registers which store the highest QM and its associated port frequency as the ports are scanned. As each port is scanned, and if and only if a time-slot is available, compare and rank circuit 315 stores the measured QM and its port frequency if the measured QM is greater than the stored QM of another port that was determined at a previous scan frequency. After scanning through all port frequencies, controller 302 energizes lead 321, which is connected to maximum latch 316. Maximum latch 316 thereupon transfer what is the resultant maximum QM, $QM_{max}$, and its associated port frequency, then stored in circuit 315, to comparison circuit 317. Comparison circuit 317 then compares $QM_{max}$ with a predetermined threshold, $QM_{thresh}$. If $QM_{max}$ is below $QM_{thresh}$, then the quality of a call made through the port associated with this "best" quality measure would be below set standards. In this case, in response to a signal on lead 318 at the output of comparator 317, controller blocks the call. If on the other hand, however, $QM_{max}$ is greater than $QM_{thresh}$, the port frequency associated with $QM_{max}$ is input over lead 318 to controller 302. Controller 302 selects this port frequency as its downlink frequency, $f_{RX}$, and the uplink frequency, $f_{TX}$, associated with this particular $f_{RX}$, which are input over lead 310 to synthesizer 309. Synthesizer 309 then inputs $f_{TX}$ and $f_{RX}$ to the transmit and receive circuitry 306 and 307, respectively. The call is then routed to the selected port using access protocol procedures which are not part of the present invention and will not be described herein.

As can be noted from the description hereinabove, routing of the call and access to the portable radio communication system is not attempted until a port is found having both an available time-slot and a quality measure that exceeds a predetermined threshold. As previously mentioned, this increases the throughput of the network since routing to busy or to poor signal quality ports is not attempted.

Although described in connection with a TDM/TDMA portable radio communications system, the autonomous selective routing method of the present invention could also be applied to any frequency-reusing system, such as a frequency-division multiple access (FDMA) system, which is employed for cellular mobile radio telephony. To apply this method for an FDMA system, the portable unit would need to scan all control frequencies that are associated with individual base stations but frequency-separated from the regular communications channels. Due to different fading characteristics on control and communications channels, the QM derived from scanning the control channels may not be achieved on the communications channels, resulting in suboptimal performance. However, the autonomous distributed nature of the present invention, which departs from the prior art, is still preserved.

The above-described embodiment is illustrative of the principles of the present invention. Other embodiments may be devised by those skilled in the art without departing from the spirit and scope of the present invention.

What is claimed is:

1. In a frequency-reusing radio communications system having a plurality of fixed base units and a plurality of mobile transceivers, each fixed base unit transmitting signals at an associated downlink frequency to at least one mobile transceiver and receiving signals at an associated uplink frequency from at least one mobile transceiver, each mobile transceiver having a transmitter for transmitting signals at any one of a plurality of uplink frequencies to any one of said plurality of fixed base units and a receiver for receiving signals at any one of a plurality of associated downlink frequencies from any one of said plurality of fixed base units, a method of autonomously determining at a mobile transceiver the particular one of the plurality of fixed base units through which to access the system, comprising the steps of:
    (a) measuring the quality of the signal received at a particular downlink frequency from a fixed base unit;
    (b) determining from that downlink frequency signal whether that fixed base unit is available to accept a transmission from the mobile transceiver;
    (c) repeating steps (a) and (b) for each of the downlink frequencies used in the system;
    (d) determining from only the available fixed base units, the fixed base unit having the highest signal quality measure; and
    (e) accessing the system by transmitting on the uplink frequency associated with the downlink frequency of the available fixed base unit having the highest signal quality measure.

2. In a frequency-reusing radio communications system having a plurality of fixed base units and a plurality of mobile transceivers, each fixed base unit transmitting signals at an associated downlink frequency to at least one mobile transceiver and receiving signals at an associated uplink frequency from at least one mobile transceiver, each mobile transceiver having a transmitter for transmitting signals at any of a plurality of uplink frequencies to any one of said plurality of fixed base units and a receiver for receiving signals at any one of a plurality of associated downlink frequencies from any one of said plurality of fixed base units, a method of autonomously determining at a mobile transceiver the particular one of the plurality of fixed base units through which to access the system, comprising the steps of:

(a) measuring the quality of the signal received at a particular downlink frequency from a fixed base unit;

(b) determining from that downlink frequency signal whether the fixed base unit is available to accept a transmission from the mobile transceiver;

(c) repeating steps (a) and (b) for each of the downlink frequencies used in the system;

(d) determining from only the available fixed base units, the fixed base unit having the highest signal quality measure;

(e) comparing that highest signal quality measure with a predetermined threshold signal quality measure; and (f) accessing the system by transmitting on the uplink frequency associated with the downlink frequency of the available fixed base unit having the highest signal quality measure if that highest signal quality measure is greater than the predetermined threshold signal quality measure.

3. The method of claim 2 further comprising the step of blocking a transmission from the mobile transceiver if the highest signal quality measure is less than the predetermined threshold quality measure.

4. In a TDM/TDMA digital telephony system having a plurality of fixed ports and a plurality of mobile portable units, each port transmitting signals in a plurality of time-slots at an associated downlink frequency to at least one portable unit and receiving signals at an associated uplink frequency from at least one portable unit, each portable unit having a transmitter for transmitting signals at any one of a plurality of uplink frequencies to any one of said plurality of ports and a receiver for receiving signals at any one of a plurality of associated downlink frequencies from any one of said plurality of ports, a method at a portable unit of autonomously accessing the system, comprising the steps of:

(a) measuring the quality of the signal received at a particular downlink frequency from a port;

(b) determining from that downlink frequency signal whether that port has an idle time-slot;

(c) repeating steps (a) and (b) for each downlink frequency used in the system;

(d) determining from only the ports having an idle time-slot, the port having the highest signal quality measure; and (e) accessing the system by transmitting on the uplink frequency associated with the downlink frequency of the port with an idle time-slot having the highest signal quality measure.

5. The method of claim 4 wherein the measure of quality of the signal received at each downlink frequency is that signal's vector sum of the X and Y components of expanded and collapsed differential phase angles.

6. The method of claim 4 wherein the step of determining from the downlink signal whether a port has an idle time-slot comprises the step of examining each time-slot of the downlink signal for a predetermined idle bit pattern.

7. In a TDM/TDMA digital telephony system having a plurality of fixed ports and a plurality of mobile portable units, each port transmitting signals in a plurality of time-slots at an associated downlink frequency to at least one portable unit and receiving signals at an associated uplink frequency from at least one portable unit, each portable unit having a transmitter for transmitting signals at any one of a plurality of uplink frequencies to any one of said plurality of ports and a receiver for receiving signals at any one of a plurality of associated downlink frequencies from any one of said plurality of ports, a method at a portable unit of autonomously accessing the system, comprising the steps:

(a) measuring the quality of the signal received at a particular downlink frequency from a port;

(b) determining from that downlink frequency signal whether that port has an idle time-slot;

(c) repeating steps (a) and (b) for each downlink frequency used in the system;

(d) determining from only the ports having an idle time-slot, the port having the highest signal quality measure;

(e) comparing that highest signal quality measure with a predetermined threshold signal quality measure; and (f) accessing the system by transmitting on the uplink frequency associated with the downlink frequency of the port with an idle time-slot having the highest signal quality measure if that highest signal quality measure is greater than the predetermined threshold signal quality measure.

8. The method of claim 7 further comprising the step of blocking a transmission from the portable unit if the highest signal quality measure is less than the predetermined threshold signal quality measure.

9. The method of claim 7 wherein the measure of quality of the signal received at each downlink frequency is that signal's vector sum of the X and Y components of expanded and collapsed differential phase angles.

10. The method of claim 7 wherein the step of determining from the downlink signal whether a port has an idle time-slot comprises the step of examining each time-slot of the downlink signal for a predetermined idle bit pattern.

11. In a frequency-reusing radio communications system having a plurality of fixed base units and a plurality of mobile transceivers, each fixed base unit transmitting signals at an associated downlink frequency to at least one mobile transceiver and receiving signals at an associated unlink frequency from at least one mobile transceiver, each mobile transceiver comprising a transmitter for transmitting signals at any one of a plurality of uplink frequencies to any one of said plurality of fixed base units and a receiver for receiving signals at any one of a plurality of associated downlink frequencies from any one of the plurality of fixed based units, each mobile transceiver further comprising means for autonomously determining the particular fixed base unit through which to access the system comprising:

means for measuring the quality of a signal received from a fixed base unit at an input downlink frequency;

means for determining from the received downlink frequency signal whether the associated fixed base unit is available to accept a transmission;

means for scanning the downlink frequency input to said measuring means to each of the downlink frequencies used in the system;

means for determining from only the available fixed base units, the fixed base unit having the highest signal quality measure;

means for setting the uplink and downlink frequencies of the mobile transceiver's transmitter and receiver, respectively, to the uplink and downlink frequencies associated with the available fixed base unit having the highest signal quality measure.

12. A mobile transceiver in a frequency-resuing radio communications system in accordance with claim 11 further comprising:

means for comparing the highest signal quality measure with a predetermined threshold signal quality measure; and means for blocking a transmission by the mobile transceiver if the highest signal quality measure of available fixed base units is less than the predetermined threshold signal quality measure.

13. In a TDM/TDMA digital telephony system having a plurality of fixed ports and a plurality of mobile portable units, each port transmitting signals in a plurality of time-slots at a downlink frequency to at least one portable unit and receiving signals at an associated uplink frequency from at least one port, each portable unit comprising a transmitter for transmitting signals at any one of a plurality of uplink frequencies to any one of said plurality of ports and a receiver for receiving signals at any one of a plurality of associated downlink frequencies from any one of the plurality of ports, each portable unit further comprising means for autonomously determining the particular port through which to access the system comprising:

means for measuring the quality of a signal received from a port at an input downlink frequency;

means for determining from the received downlink frequency signal whether the associated port has an idle time-slot;

means for scanning the downlink frequency input to said measuring means to each of the downlink frequencies used in the system;

means for determining from only the ports having an idle time-slot, the port having the highest signal quality measure;

means for setting the uplink and downlink frequencies of the portable unit's transmitter and receiver, respectively, to the uplink and downlink frequencies associated with the port having an idle time-slot and the highest signal quality measure.

14. A portable unit in a TDM/TDMA digital telephony system system in accordance with claim 13 further comprising:

means for comparing the highest signal quality measure of ports having an idle time-slot with a predetermined threshold signal quality measure; and means for blocking a transmission by the portable unit if the highest signal quality measure of ports having an idle time-slot is less that the predetermined threshold signal quality measure.

15. A portable unit in accordance with claim 14 further comprising detecting means for determining whether a predetermined idle bit pattern is present in any of the time-slots of a signal received from any port.

* * * * *